United States Patent [19]
Waltonen et al.

[11] Patent Number: 4,763,550
[45] Date of Patent: Aug. 16, 1988

[54] SELF EQUALIZING PIERCING MACHINE

[75] Inventors: Edward J. Waltonen, Southfield; Robert E. Obrecht, Bloomfield Hills, both of Mich.

[73] Assignee: Lamb Robo, Bloomfield Hills, Mich.

[21] Appl. No.: 859,016

[22] Filed: May 2, 1986

Related U.S. Application Data

[63] Continuation-in-part of Ser. No. 427,048, Sep. 29, 1982, Pat. No. 4,716,803.

[51] Int. Cl.$^4$ .............................................. B21D 5/12
[52] U.S. Cl. ....................................... 83/191; 83/193; 83/639; 83/615
[58] Field of Search ............... 72/401, 407, 453.01, 72/453.02, 472, 333; 83/188, 191, 192, 193, 639, 615, 519

[56] References Cited

U.S. PATENT DOCUMENTS

| | | | |
|---|---|---|---|
| 3,008,032 | 11/1961 | Wolfbauer, Jr. | 219/89 |
| 3,270,604 | 9/1966 | Waltonen | 83/140 |
| 3,396,260 | 8/1968 | Waltonen | 219/89 |
| 3,897,707 | 8/1975 | Kruse | 83/615 |
| 4,098,161 | 7/1978 | Bloch | 83/639 |

Primary Examiner—Daniel C. Crane
Attorney, Agent, or Firm—Krass & Young

[57] ABSTRACT

An apparatus for performing two successive work operations on a workpiece in an equalized force mode. The apparatus includes a base; a yoke mounted for bi-directional movement on the base and carrying a two-sided punch on its upper face; a ram member mounted within the yoke and including two bores opening in opposite faces of the ram member and slidably receiving two pistons secured to the opposite end walls of the yoke; and means for delivering pressurized fluid through the pistons to sealed pressure chambers defined at the inner ends of the pistons between the piston inner ends and the respective confronting faces of the ram to selectively move a pair of die members carried on the upper face of the ram into and out of punching coacting with the double punch carried on the yoke. A force balance system acts to initially move the ram on the yoke in response to the introduction of pressurized fluid to either sealed chamber whereafter, upon engagement of suitable stop means, the pressure fluid acts to move the yoke on the base in a complimentary direction to bring one of the punches into coaction with one of the die members whereafter the pressure fluid is routed to the other sealed chamber and a similar sequence follows to achieve the second punching operation involving the double punch and the other die member.

13 Claims, 3 Drawing Sheets

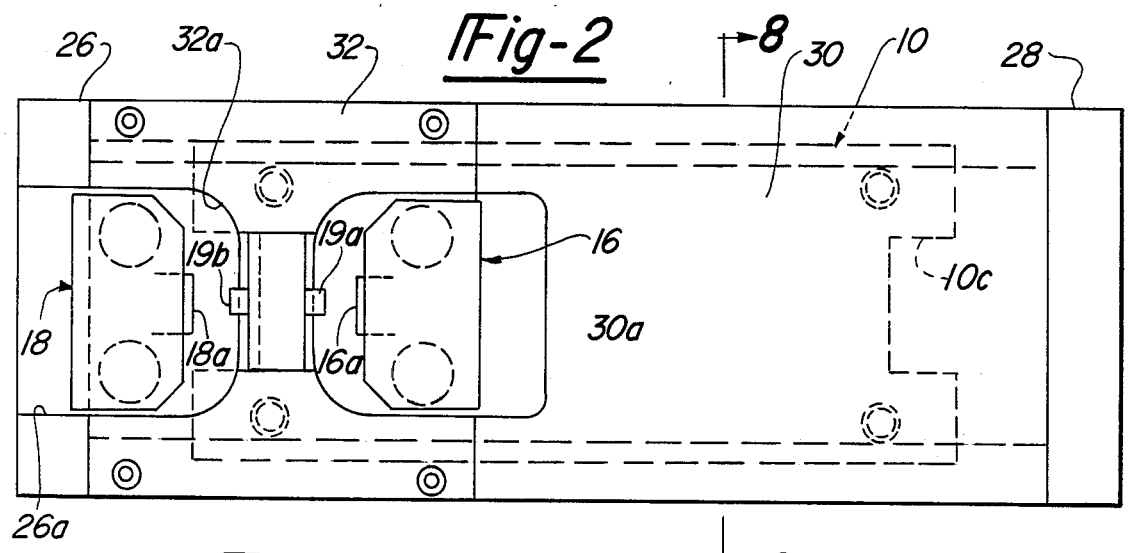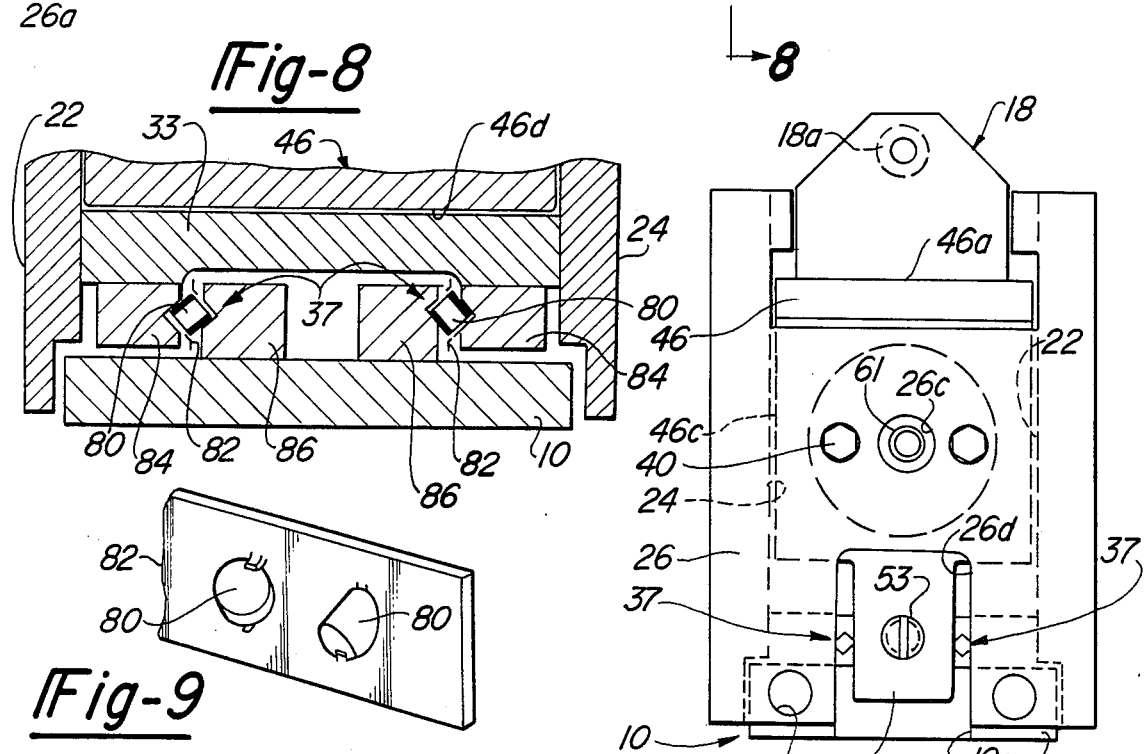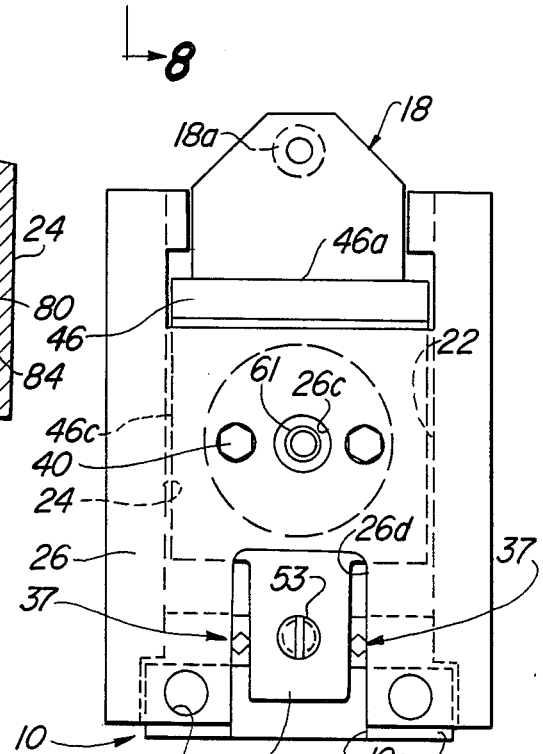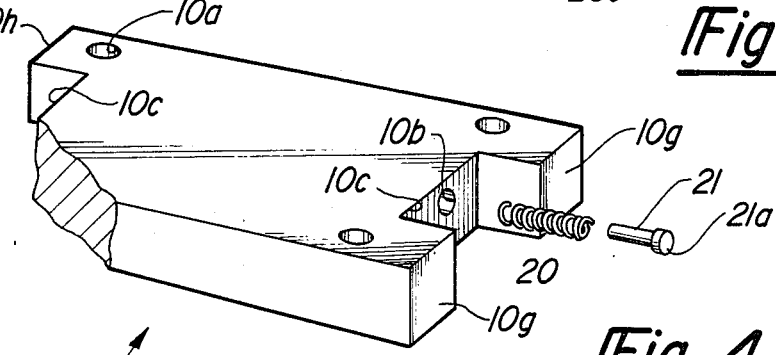

SELF EQUALIZING PIERCING MACHINE

This application is a continuation-in-part of Ser. No. 427,048, filed Sept. 29, 1982, Pat. No. 4,716,803.

BACKGROUND OF THE INVENTION

This invention relates to devices for performing mechanical operations such as piercing, punching and forming on a workpiece and more particularly to an improved device for applying mechanical forces to the workpiece in a self-equalizing fashion.

Mechanical operations such as piercing, punching, shape forming and resistance welding are common to many industrial fabrication processes. In many instances, it is desirable or necessary to perform such operations on a relatively thin section workpiece which is already finished to proper size and material specifications. For example, it may be necessary to pierce or punch a hole or a group of holes in a metal bracket which is stamped, finished and heat treated prior to the piercing or punching operations. Under these circumstances, it is important to avoid any significant deformation or reshaping of the workpiece during the piercing or punching operation. This can be achieved through the use of "self-equalizing" fabrication devices or machines; i.e., a device or machine which engages and applies equal forces to the opposite sides of the workpiece during the mechanical operation so that undesirable inelastic deformation is avoided.

There are many prior art devices which are capable of accomplishing mechanical operations in a self-equalized fashion such, for example, as the devices disclosed in U.S. Pat. Nos. 3,008,032, 3,396,260, and 4,098,161. Each of these patents disclose apparatus capable of performing one or more work operations on a workpiece in a self-equalized fashion so as to avoid undesirable inelastic deformation of the workpiece during the work operations.

These specific prior art devices, as well as other similar prior art devices of the self-equalizing type, tend to involve a very complicated construction and therefore tend to result in a high initial manufacturing cost as well as a high maintenance cost. Also, by virtue of their bulk and complexity, these prior art devices tend to be difficult to mount in certain orientations so that their usability in a universal sense is severly limited.

BRIEF SUMMARY OF THE INVENTION

The present invention is directed to the provision of an apparatus of the self-equalizing type which is extremely simple in construction and operation.

More particularly, the present invention is directed to the provision of an apparatus of the self-equalizing type which is capable of performing a plurality of work operaions in sequence in a simple and effective manner.

The self-equalized apparatus of the invention comprises a base; a yoke member mounted for bi-directional movement on the base; a ram member mounted for bi-directional movement on the yoke; first and second fabricating tools mounted in spaced relation on one of the members; a third fabricating tool mounted on the other of the members in a position between but spaced from the first and second tools and respectively coactable with the first and second tools to perform respective work operation on the workpiece; and means operative to move the ram on the yoke and the yoke on the base in complimental converging directions effective to bring the third tool into coaction with the first tool, whereby to perform a first work operation on the workpiece, and thereafter operative to move the ram on the yoke and the yoke on the base in complimental converging directions effective to bring the third tool into coaction with the second tool, whereby to perform a second work operation on the workpiece.

According to a further feature of the invention, first and second spaced sealed volumes are defined within the apparatus, each bounded at opposite sides of the volume by respective force surfaces on the yoke and on the ram; and fluid under pressure is delivered to the first sealed volume, whereby to effect complimental converging movement of the yoke and ram to perform the first work operation, and fluid under pressure is thereafter delivered to the second sealed volume, whereby to effect complimental converging movementtn of the yoke and ram to perform the second work operation.

According to a further feature of the invention, the apparatusincludes means providing more resistance to relative movement beween the yoke and the base than between the ram and the yoke so that the initial movement in each case involves movement of the ram on the yoke; and coacting stop means are provided on the ram and on the base which operate in each case tolimit the movement of the ram on the yoke so that the yoke thereafter moves relative to the base.

In the disclosed embodiment of the invention, the yoke includes a pair of spaced end plates with a pair of pistons respectively rigidly secured to the end plates and extending inwardly therefrom toward each other to dispose their inner ends in confronting, spaced relation; the ram member comprises an elongated monolithic structure with axial bores opening at each end face thereof with a central partition portion between the inner ends of the bores; the pistons of the yoke member are slidably and sealingly received in the respective bores of the ram; and the first and second sealed volumes are respectively defined between the partition of the ram and the pistons of the yoke member with the force surfaces defined by the piston inner ends and the respective confronting surfaces of the partition.

BRIEF DESCRIPTION OF THE DRAWINGS

FIG. 2 is a top view of the invention apparatus;

FIG. 3 is an end view of the invention apparatus;

FIG. 4 is a perspective view of the base member of the invention apparatus;

FIG. 8 is a somewhat schematic cross sectional view taken on line 8—8 of FIG. 2; and FIG. 9 is a fragmentary perspective view of a portion of a bearing assembly seen in FIG. 8.

DETAILED DESCRIPTION OF THE PREFERRED EMBODIMENT

Figure 1:
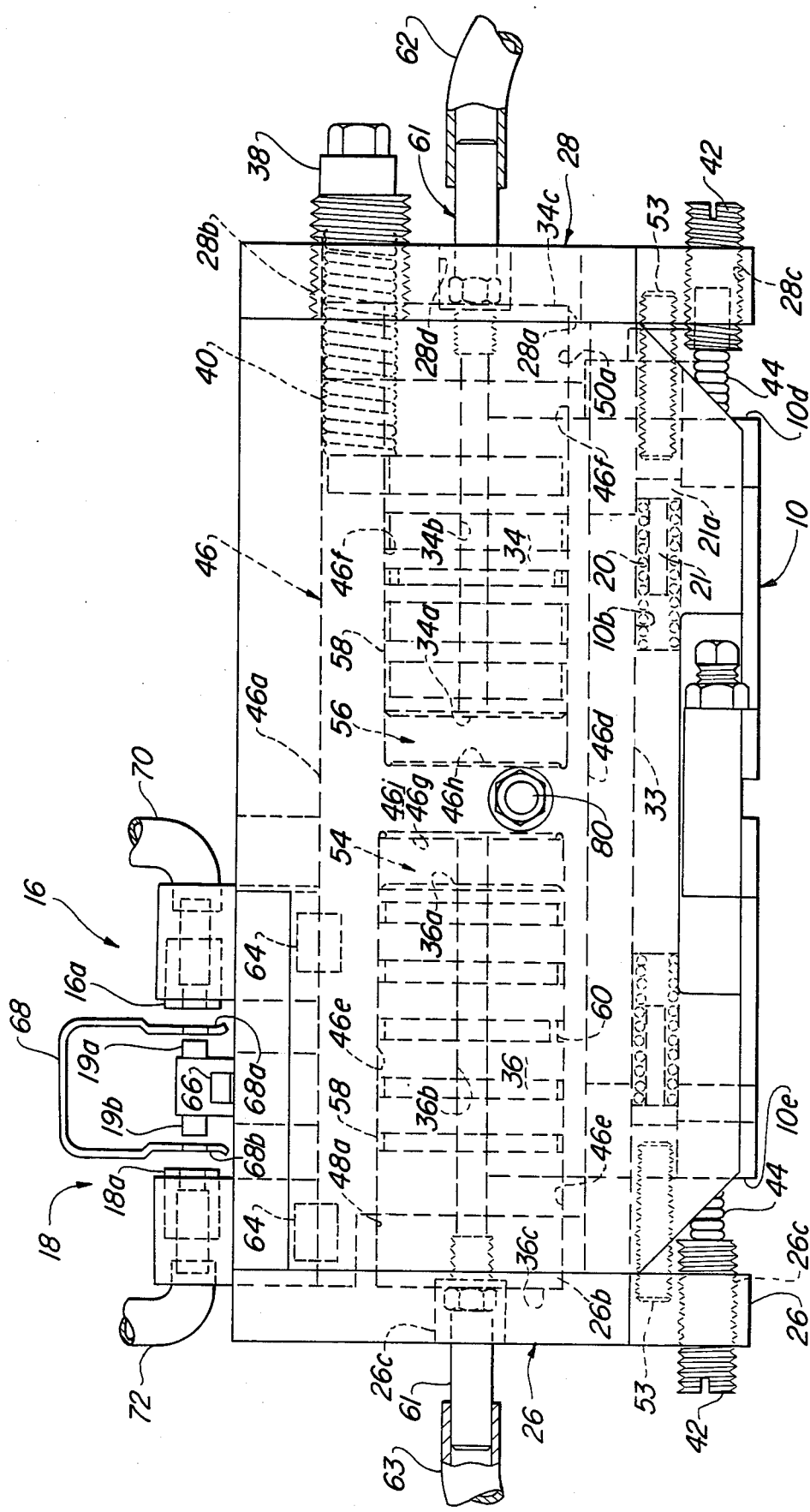
FIG. 1 is a side elevational view of the invention apparatus.

The invention apparatus, broadly considered, comprises a base 10; a yoke 12; a ram 14; a pair of dies 16 and 18; and a punch 19.

Base 10 comprises a simple rectangular steel plate including holes 10a for mounting the plate in any desired location or orientation on a suitable support surface. A coil spring 20 is received in a bore 10b in each end of base 10 and a pin 21 is received in each coil spring 20. Each bore 10b is positioned in a cutout 10c in the respective end of the base.

Yoke 12 is formed of steel and has a cage configuration including side plates 22 and 24; end plates 26 and 28; a righthand top plate 30; a lefthand top plate 32; a bottom plate 33; a right piston 34; and a left piston 36. The lower portions 22a and 24a of the side plates embrace the longitudinal side edges 10b and 10c of base 10 and linear roller bearings 37 of known form are interposed between base 10 and yoke bottom plate 33 to mount yoke 12 on base 10 for smooth friction free bidirectional movement theralong.

Upper plate 30 includes a cutout 30a and upper plate 32 includes opposed cutouts 32a and 32b and a raised central pad or mounting portion 32c. Cutout 32b is in alignment with cutout 30a in top plate 30 and cutout 32a is in alignment with a cutout 26a in end plate 26. Pistons 34 and 36 are respectively secured to end plates 28 and 26 by bolts 40 passing through the respective end plate for threaded engagement with the respective piston. The outer ends of the pistons are seated in counterbores 26b and 28a in the respective end plate. A pair of hollow adjusting screws 38 (only one shown) are threadably received in threaded bores 28b in the upper corners of end plate 28 and a coil spring 41 is received within the hollow interior of each adjusting screw 38. Hollow adjusting screws 42 are threadably received in a pair of threaded bores 28c in the lower corners of end plate 28 and in a pair of threaded bores 26c in the lower corners of plate 26. A coil spring 44 is positioned within the hollow interior or each adjusting screw 42. Cutouts 26d, 28d are respectively provided in the lower edge of plates 26, 28.

Ram 14 includes a monolithic central steel block member 46 and steel end plates 48 and 50 suitably secured to the opposite ends of monolithic block 46. Block 46 is of rectangular cross section and includes a flat upper surface 46a, side surfaces 46b and 46c, and a flat bottom surface 46d. Block 46 further includes a pair of aligned bores 46e and 46f respectively aligned with central bores 48a and 50a in end plates 48 and 50. A pair of slots 52 are provided in the upper corners of end plate 50 and the upper corners of the adjacent portion of block 46. Each end plate 48, 50 includes a lower tab portion 48b, 50b including a threaded bore 48c, 50c for threaded receipt of an adjusting screw 53.

In the assembled relation of the parts, as best seen in FIG. 1, block member surfaces 46a, 46b, 46c and 46d have respective bearing interface with the adjacent inner surfaces of yokes plates 30 and 32, 22, 24, and 33, respectively, and bores 46e, 48a and 46f, 50a respectively receive pistons 36 and 34 with sealed volumes or chambers 54 and 56 defined between the inner ends 36a and 34a of the pistons and the confronting surfaces 46g and 46h of the central partition 46i separating bores 46e and 46f. A plurality of glide rings 58 are received in suitable grooves in the piston to guide the sliding movement of the pistons relative to the bores and a sealing piston ring 60 is provided on each piston to preclude pumping of fluid along the walls of the piston. A central axial passage 34b in piston 34 is aligned with a fitting 61 secured to the outer face 34c of the piston and positioned in a hole 28d in end plate 28. Bore 34b and fitting 61 coact to allow the supply of pressurized hydraulic fluid to chamber 56. Similarly, a bore 36b in piston 36 is aligned with a fitting 61 secured to the outer face 36c of piston 36 and positioned in hole 26d in end plate 26 to allow the supply of pressurized fluid to chamber 54. Springs 44 and received in hollow adjusting screws 42 and bear at their free ends against the respective end faces 10g and 10h of base plate 10. Springs 40 are received at one end in adjusting screws 38 and are received at their other ends in a respective slot 52. Springs 20 and pins 21 are received in bores 10b in the base with the head 21a of each pin 21 in adjacent but spaced relation to the inner end of the respective adjusting screw 53. Screws 53 are threadably received in bores 48c, 50c in tab portions 48b, 50b of ram end plates 48, 50 and are accessible through cutouts 26d, 28d in yoke end plates 26, 28. Fabricating tools 16 and 18 are secured to the upper face 46a of monolithic block 46 as by keys 64 and extend upwardly through aligned slots 30a, 32b and 26a, 32a, respectively, in yoke 12. Fabricating tool 19 is secured to raised surface 32c on plate 32 of yoke 32 by a key 66. In one preferred form of the invention, fabricating tools 16 and 18 comprise dies including hollow die buttons 16a and 18a and fabricating tool 19 comrpises a punch having opposed punch buttons 19a and 19b for respective coaction with die buttons 18a and 16a. This arrangement of fabricating tools is suitable, for example, for providing two equalized punching operations with respect to a workpiece such as the U-shaped bracket member 68 seen in FIG. 1.

Linear roller bearings 37, as seen in FIGS. 8 and 9, include small cylindrical rollers 80 mounted in cages 82 and rollably engaging elongated ways 84 secured to the lower face of yoke bottom plate 33 and further elongated ways 86 secured to the upper face of base 10. Rollers 80 are of equal axial length and diameter and are mounted in cage 80 such that every other roller is placed in an opposite bearing support orientation; that is, the rollers are mounted with the roller axes at alternate 90° angular variations.

In use, adjustment screws 38 are adjusted to move ram 14 relative to yoke 12 to a point where punch 19 is centered exactly between dies 16 and 18. Part 68 is thereafter moved into position between the punch and dies and screws 53 are adjusted to move the yoke and ram assembly as a unit relative to the part to center the legs 68a and 68b of the part relative to punch 19 and dies 16 and 18. Pressurized hydraulic fluid or pressurized air is now admitted through line 62 for passage through bore 34b and into chamber 56. Since movement of yoke 12 relative to base 10 is resisted by springs 44, the pressurized fluid acting in chamber 56 initially has the effect of moving ram 14 to the left as viewed in FIG. 1 with the ram slidably guiding on pistons 34 and 36. Movement of the ram to the left as viewed in FIG. 1 continues until die button 16a is substantially adjacent the right face of leg 68a of part 68, at which time the inner end of righthand adjustment screw 53 engages head 21a of the assocated pin 21 to provide a cushion stop for the ram movement and preclude damage or distortion to leg 68a. Since ram 12 is now precluded from further leftward movement by the strong coil spring 21, the pressure fluid acting in chamber 56 now has the effect of moving the yoke 12 to the right as viewed in FIG. 1 to bring punch button 19a into punching coaction with die button 16a and punch a hole in bracket leg 68a with the slug being exhausted in known manner through an exhaust conduit 70. Rightward movement of the yoke is resisted by relatively weak spring 44 and the end of the stroke is determined by bottoming of piston 36 against partition wall 46g. As the piston 36 bottoms against wall 46g, a suitably positioned limit switch is actuated to switch the valve controlling the supply of pressurized hydraulic fluid to a position in which line 62 is dumped to neutral and pressurized fluid is supplied to line 63 for passage through bore 36b and into pressure chamber 54. Since movement of the yoke is again resisted by springs 44, the pressure fluid in chamber 54 initially acts against partition surface 46g to move ram 12 to the right as viewed in FIG. 1 to move die button 18a toward the left face of the left leg 68b of part 68. As die button 18a approaches leg 68b, the inner end of lefthand adjustment screw 53 engages head 21a of the associated pin 21 to provide a cushion stop for the rightward movement of the ram to bring die button 18a into juxtaposition with leg 68b without distorting the leg. The pressure fluid in chamber 54 now acts against piston end surface 36a to move yok 12 to the left as viewed in FIG. 1 against the resistance of springs 44 and bring punch button 19b into punching coaction with die button 18a to punch a hole in leg 68b with the slug again being exhausted in known manner through an exhaust hose 72. At this point a suitable limit switch is actuated to move the control valve to position in which both lines 62 and 63 are dumped to neutral so that the yoke and ram return to their neutral positions under the influence of the various balance springs. The invention apparatus is now ready for another dual punching operation.

Figures 5, 6, 7:
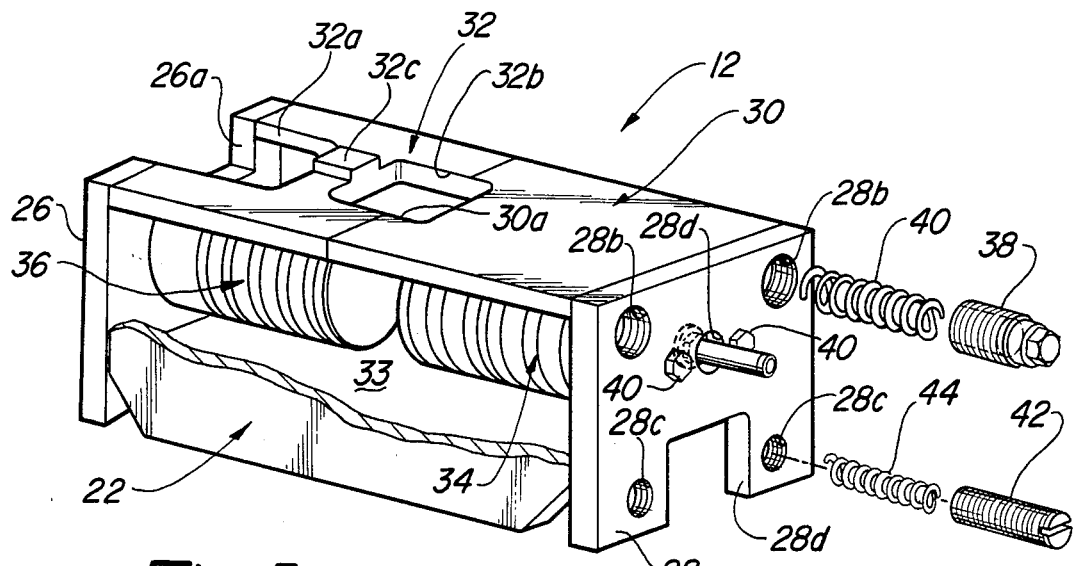
FIG. 5 is a perspective view of the yoke member of the invention apparatus.
FIG. 6 is a perspective view of the ram member of the invention apparatus.
FIG. 7 is a fragmentary view of a modified apparatus according according to the invention.

A modified structure for securing pistons 34, 36 of the yoke to end plates 28, 26 of the yoke is seen in FIG. 7. Although only piston 34 and end wall 28 are illustrated in FIG. 7, it will be understood that piston 36 and end wall 26 are similarly modified. In the modified construction, the outer end of piston 34 includes a reduced diameter threaded portion 34d passing through a central bore 28d in end plate 28 and threadably receiving a floating step ring 74, a threaded back-up washer 76 and a lock nut 78. A flange portion 74a of ring 74 is received in a counterbore 28e in end plate 28 and sealed against an annular shoulder surface 28f interconnecting bore 28d and counterbore 28e. This modified construction provides a limited amount of play between the piston and the end plate so that the piston and end plate can assume their proper operational positions irrespective of tolerance variations in the various inner engaging surfaces on the piston and end plate. The modified construction also allows the stroke of the apparatus to be selectively modified by selectively threading the member 74, 76 and 78 along reduced diameter threaded piston portion 34d.

The invention apparatus provides an extremely simple and compact machine for performing a dual equalized fabricating operation such as punching or the like. The integral design of the ram and pistons and the routing of hydraulic fluid through the integrated lines of prior art devices are significantly reduced and simplified. Further, since the ram is totally captive within the yoke and enjoys a total bearing interface with the yoke along all four rectangular side surfaces of the ram, it is not critical that the punching or other operation be carried out on a centered basis with respect to the total apparatus but, rather, the captive and extensive bearing of the ram within the yoke allows punching or the like over a wide range of off centered locations.

Whereas a preferred embodiment to the invention has been illustrated and described in detail, it will be apparent that various changes may be made in the disclosed embodiment without departing from the scope or spirit of the invention. For example, although pistons 34 and 36, and the corresponding bores 46e and 46f in ram block member 46, are illustrated to be of equal size, it will be apparent that the piston and bore sizes may be made dissimilar if it is desired to perform dissimilar work operations on the two arms 68a, 68b of workpiece 68. Also, although the pressurized fluid is illustrated as being delivered to chambers 54, 56 through central passages 34b, 36b in pistons 34, 36 the pressurized fluid may alternatively be delivered through a port 80 in side wall 46b of ram block 46 and thence to central partition 46i for selective delivery through suitable axial passages in partition 46i to chambers 54, 56.

We claim:

1. Apparatus for performing work operations on a workpiece in an equalized force mode so as to prevent distortion of the workpiece during the work operations, said apparatus comprising:
   (A) a base;
   (B) a yoke member mounted for bi-directional movement on said base along a first axis;
   (C) a ram member mounted for bi-directional movement on said yoke along a second axis parallel to said first axis;
   (D) first and second fabricating tools mounted in spaced relation on one of said members;
   (E) a third fabricating tool mounted on the other of said members in a position between but spaced from said first and second tools and respectively coactable with said first and second tools to perform respective first and second work operations on the workpiece; and
   (F) means operative to move said ram on said yoke and said yoke on said base in complimental converging directions effective to bring said third tool into coaction with said first tool whereby to perform the first work operation on the workpiece, and thereafter operative to move said ram on said yoke and said yoke on said base in complimental converging directions effective to bring said third tool into coaction with said second tool, whereby to perform the second work operation on the workpiece.

2. An apparatus according to claim 1 wherein said operative means comprises:
   (G) means defining first and second spaced sealed volumes within said apparatus each bounded at opposite sides by respective force surfaces on said yoke and on said ram; and
   (H) means for delivering fluid under pressure to said first volume, whereby to effect complimental converging movement of said yoke and ram in a sense to perform the first work operation, and for thereafter delivering fluid under pressure to said second volume, whereby to effect complimental converging movement of said yoke and ram in a sense to perform the second work operation.

3. An apparatus according to claim 2 wherein:
   (I) said apparatus includes means providing more resistance to relative movement between said yoke and said base than between said ram and said yoke so that the initial movement in each case involves movement of said ram on said yoke; and
   (J) said operative means includes coacting stop means on said ram and on said base operative in each case to limit the movement of said ram on said yoke so that the yoke thereafter moves relative to said base.

4. An apparatus according to claim 3 wherein:
   (K) said yoke member includes a pair of spaced end plates with a pair of pistons respectively rigidly secured to said end plates and extending inwardly therefrom toward each other along an axis parallel to said first and second axes to dispose their inner ends in confronting, spaced relation;

(L) said ram member comprises an elongated monolithic strucure with axial bores opening at each end face thereof with a central partition portion between the inner ends of the bores;

(M) said pistons are slidably and sealing received in said bores; and (N) said first and second volumes are respectively defined between said partition and said pistons with said force surfaces defined by said piston inner ends and the respective confronting surfaces of said partition.

5. An apparatus according to claim 4 wherein:

(N) said ram member has a rectangular cross section; and (O) said yoke has a cage configuration and includes flat axially extending inner surfaces providing bearing interface with each of the rectangular side surfaces of said ram.

6. Apparatus for performing a work operation on a workpiece in an equalized force mode comprising:

(A) a ram of rectangular cross section and including a blind bore extending axially lengthwise therein and opening at one end face thereof;

(B) a first fabricating tool positioned on said ram;

(C) a base;

(D) a yoke having a hollow rectangular cross-sectional configuration and including flat axially extending inner surfaces providing bearing interface with each of the rectangular side surfaces of said ram to mount said ram for reciprocal movement within the hollow of said yoke;

(E) guide means on said base engaging and coacting with guide means on said yoke to mount said yoke on said base for reciprocal movement on said base;

(F) a piston carried by said yoke and slidably received in said bore in said ram to define a sealed volume between the inner end of said piston and the confronting surface of said ram;

(G) a second fabricating tool positioned on said yoke in confronting relation to said first fabricating tool; and (H) means for delivering pressurized fluid to said sealed volume to effect complimental movement of said yoke on said base and said ram in said yoke in a sense to move said first and second fabricating tools into coacting relation.

7. An apparatus for performing a work operation on a work piece comprising:

(A) a base member;

(B) a yoke;

(C) bearing means mounting said yoke for reciprocal movement on said base member;

(D) a ram member mounted for reciprocal movement in said yoke;

(E) power means for moving said ram member reciprocally within said yoke;

(F) a first die on said yoke;

(G) a second coacting die on said ram member;

(H) balance means providing more resistance to sliding movement of said yoke on said base than to said ram on said yoke so that the initial movement as between said yoke, ram and base involves movement of said ram on said yoke; and (I) coacting stop means on said ram and on said base operative to limit the movement of said ram on said yoke so that the yoke thereafter moves on said base.

8. An apparatus according to claim 7 wherein:

(J) said yoke defines a ram chamber of rectangular cross section; and (K) said ram is rectangular in cross section.

9. An apparatus according to claim 8 wherein:

(L) said ram chamber and said ram have a square cross section.

10. An apparatus according to claim 8 wherein:

(L) said bearing means comprise linear roller bearings between said yoke and said base member.

11. An apparatus according to claim 10 wherein:

(M) said yoke includes four side plates defining said ram chamber with two of said side plates extending beyond a third one of said side plates to define a closed area therebetween; and (N) said base and said linear roller bearings are positioned within said enclosed are.

12. An apparatus according to claim 11 wherein:

(O) said coacting stop means comprises a lateral extension of said ram extending into said enclosure for coaction with spring means on said base.

13. Apparatus for performing a work operation on a workpiece in an equalized force mode comprising:

(A) a ram including a blind bore extending lengthwise therein and opening at one end face thereof;

(B) a first fabricating tool positioned on the upper face of said ram;

(C) a base;

(D) a yoke slidably mounted on said base and including a piston slidably received in said bore to define a sealed volume between the inner end of said piston and the confronting surface of said ram;

(E) a second fabricating tool positioned on said yoke in confronting relation to said first fabricating tool; and (F) means for delivering pressurized fluid to said sealed volume to effect complimental movement of said yoke on said base and said ram on said yoke in a sense to move said first and second fabricating tools into coacting relation;

(G) said apparatus further including balance means providing more resistance to sliding movement of said yoke on said base than to said ram on said yoke so that the initial movement as between said yoke, ram and base involves movement of said ram on said yoke; and (H) said apparatus further including coacting stop means on said ram and on said base operative to limit the movement of said ram on said yoke so that the yoke thereafter moves on said base.

* * * * *